United States Patent

Birnbaum et al.

[11] Patent Number: 5,923,821
[45] Date of Patent: Jul. 13, 1999

[54] DIGITAL IMAGE TRAPPING SYSTEM

[75] Inventors: David Birnbaum, Pittsford; Tse-kee Chan, Penfield; Bradley W. Smith, Castile; Fritz F. Ebner, Rochester; Stephen F. Linder, Fairport, all of N.Y.

[73] Assignee: Xerox Corporation, Stamford, Conn.

[21] Appl. No.: 08/722,593

[22] Filed: Sep. 27, 1996

[51] Int. Cl.$^6$ .............. G06F 15/00; H04N 1/21; H04N 1/46
[52] U.S. Cl. ............. 395/109; 395/101; 395/111; 358/296; 358/500; 358/515
[58] Field of Search ................ 395/101, 109, 395/111, 114, 117, 112; 358/296, 298, 457, 500, 501, 515; 382/163, 167, 266

[56] References Cited

U.S. PATENT DOCUMENTS

| | | | |
|---|---|---|---|
| 4,700,399 | 10/1987 | Yoshida | 382/17 |
| 4,953,015 | 8/1990 | Hayasaki et al. | 358/79 |
| 5,168,552 | 12/1992 | Vaughn et al. | 395/109 |
| 5,241,396 | 8/1993 | Harrington | 358/296 |
| 5,295,236 | 3/1994 | Bjorge et al. | 395/131 |
| 5,313,570 | 5/1994 | Dermer et al. | 395/131 |
| 5,386,305 | 1/1995 | Usami | 358/518 |
| 5,392,365 | 2/1995 | Steinkirchner | 382/22 |
| 5,438,653 | 8/1995 | Boenke et al. | 395/131 |
| 5,542,052 | 7/1996 | Deutsch et al. | 395/131 |
| 5,666,543 | 9/1997 | Gartland | 395/116 |
| 5,668,931 | 9/1997 | Dermer | 395/104 |
| 5,752,057 | 5/1998 | Lifshitz et al. | 707/523 |
| 5,784,172 | 7/1998 | Coleman | 358/298 |

OTHER PUBLICATIONS

Seybold Report on Desktop Publishing, vol. 8, No. 6, pp. 1–34; Date Feb. 1, 1994.

Abobe Systems' Post Script, Language Reference Manual, Second Addition Addison–Wesley, Dec., 1990, pp. 23–45, 177–194 and 293–323.

*Primary Examiner*—Edward L. Coles
*Assistant Examiner*—Mark Wallerson

[57] ABSTRACT

A system for trapping of a dark image object on a lighter colored background is disclosed. In a system using a page description language including overprint operators, black image areas (such as text, lines, graphic objects and the like) can be set to overprint colored background areas in a manner that eliminates rendered image defects including page-colored "halo" effect that can occur when the cutout background area underlying the black object is misregistered with the black object that was intended to cover the cutout area. In other systems, the present invention may be employed as a disabling of the undercolor removal system of a colored area that would otherwise be present under the black object. Systems using black plus at least one other toners or ink color (such as cyan, magenta and/or yellow or many other colors) can usefully employ the system of the present invention. The trapping system of the present invention may also be employed on an object-oriented basis, such that different image object types are trapped according to the system of the present invention and at least one other trapping system.

20 Claims, 5 Drawing Sheets

DIGITAL IMAGE TRAPPING SYSTEM

The present invention relates to a color rendering trapping system for digital printers and copiers, and more particularly, to an apparatus and method for improving and enhancing full color output text and image quality according to a specialized and/or multimode trapping system.

In the process of digital electrostatographic printing, an electrostatic charge pattern or latent image corresponding to an original or insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. However, as toner particles are depleted from the developer mix, additional toner particles must be supplied.

In the operation of an electrophotographic copier or printer, particularly color machines, it is highly desirable to have means for processing and enhancing text and image quality (hereinafter referred to as "image quality" or the like unless otherwise noted). Particularly in the case of single or multi-pass color printers, it is highly desirable that a digital trapping system be employed to reduce imaging problems caused by misregistration, shift and other undesirable printed image qualities. Various systems and corrective actions have been taken to prevent the occurrence of these and other undesirable image attributes, to include the following disclosures may be relevant to various aspects of the image trapping and spreading (trapping) system of the present invention:

U.S. Pat. No. 5,392,365
Patentee: Steinkirchner
Issued: Feb. 21, 1995

U.S. Pat. No. 5,386,305
Patentee: Usami
Issued: Jan. 31, 1995

U.S. Pat. No. 5,313,570
Patentee: Dermer et al.
Issued: May 17, 1974

U.S. Pat. No. 5,295,236
Patentee: Bjorge et al
Issued: Mar. 15, 1994

U.S. Pat. No. 5,241,396
Patentee: Harrington
Issued: Aug. 31, 1993

U.S. Pat. No. 4,953,015
Patentee: Hayasaki et al.
Issued: Aug. 28, 1990

U.S. Pat. No. 4,700,399
Patentee: Yoshida
Issued: Oct. 13, 1987

Seybold Report on Desktop Publishing
Vol. 8, No. 6, pp. 1–34
Date: Feb. 1, 1994

Adobe Systems' "PostScript Language Reference Manual, Second Edition," Addison-Wesley, December 1990, pp. 23–45, 177–194 and 293–323.

U.S. Pat. No. 5,392,365 discloses an apparatus for detecting edges of black text in an original image. An edge detector which low pass filters the image signal to blur and widen any edges in the original image, and then high pass filters the low pass filtered signal to produce a first output signal which represents the blurred edges in the original image. The non-edge blurred signal is high pass filtered to produce a second output signal which represents the non-blurred edges in the original image.

U.S. Pat. No. 5,386,305 discloses a color image processing method and apparatus in which reproducibility of gray color is improved. UCR processing and black color density extraction processing are performed so as to compensate homogeneity of gray color by changing the setting of UCR and black color toner/ink amount in an intermediate density area and high density area.

U.S. Pat. No. 5,313,570 discloses a method for determining the boundaries between regions of color making up polychromatic document pages or images, in order to compensate for misregistration of printing plates in printing, and thereby to prevent light leaks and other errors at the boundaries so determined. A map of the boundaries is generated, to which trapping operations are applied to form a structured graphic object that is included as the last object imaged in the data representing the original image. The geometrical description of the boundary map determined according to the method of the invention is independent of specific trapping decisions applicable to the associated image.

U.S. Pat. No. 5,295,236 discloses a trapping technique which accepts a PostScript or other page description language (PDL) file and outputs a trapped PDL file. The input page is first divided into sub-portions, or tiles, and the tiles are individually processed by evaluating the input file in a corresponding clipping window. Each tile is then analyzed to determine where edges exist. The edge data is fed to an edge converter which produces a list of color transitions consisting of the analytic description of each edge and the color information along the sides of the edge. The color transition information is fed to a trapping analyzer which generates trap vectors in accordance with a set of desired trapping rules. The trap vectors are then converted to PDL form. As a final step, the trap vectors are added to the original PDL file. The final trapped page may be printed on standard typesetters without the need for special trap generator hardware.

U.S. Pat. No. 5,241,396 discloses color printing so as to create dense black images without thickened, blurred edges. Erosion of the edges on the original black bitmap is used to form a new black bitmap, which is employed to print black and colors so as to produce the dense black image.

U.S. Pat. No. 4,953,015 discloses higher density black printing in a color system, in which black colorant is used first, followed by cyan, magenta, yellow, etc. inks, which are produced according to a color matrix table and are superimposed on at least a portion of the black ink.

U.S. Pat. No. 4,700,399 discloses a color image processor with edge detection; a controller insures black reproduction quantity for an edge according to an output from the detector. Densities of color signals for yellow, magenta, and cyan edges are reduced, while enhancing reproduced black density.

The Seybold Report on Desktop Publishing surveys a variety of available trapping products and systems. Products reviewed are include PostScript language applications.

Adobe Systems' "PostScript Language Reference Manual, Second Edition," details PostScript language parameters and term definitions, color space and halftone rendering of images and other relevant information to PostScript file use and manipulation.

In accordance with one aspect of the present invention there is provided a method for preventing undesirable image artifacts from occurring in a border region between a black image area and a colored background area on an output image produced by a digital printing system. The printing system is operable to render the output images in a black plane and at least one color plane and including a processor for processing a stream of imaging data including page description language file code for clearing the at least one color plane in a trap area corresponding to a portion of the black image area. The method includes the steps of setting the page description language file code to enable rendering of the at least one color plane of the colored background area in the trap area superposed with the black image area and producing an output image including the at least one black image area, the superposed trap area with the at least one color plane and the colored background area rendered thereon.

In accordance with another aspect of the present invention, there is provided a printing system including a processor for preventing undesirable image artifacts from occurring in a border region between a black image area and a colored background area when rendering output images in a black plane and at least one color plane. The processor is operable to process a stream of imaging data including page description language file code for clearing the at least one color plane in a trap area corresponding to a portion of the black image area. The printing system also includes controller for superposing the colored background area in the trap area having the at least one color plane with the black image area and an imager for producing an output image including the at least one black image area, the superposed trap area with the at least one color plane and the colored background area.

In accordance with another aspect of the present invention, there is provided a method for multimode trapping of images according to a plurality of object types so as to prevent undesirable image artifacts from occurring in border regions between image object areas and colored background areas having at least one color separation to be produced by a multicolor digital printing system. The method includes the steps of: identifying a first object type having a first black image area; superposing the at least one color plane of the colored background area with the first black image area of the first object type in a first trap area corresponding to a size of the first black image area; identifying a second object type having a second black image area; superposing the at least one color plane of the colored background area with a portion of the second black image area of the second object type in a second trap area less than a size of the second black image area; and producing an output image including the first black image area, second black image area, first trap area, second trap area and the colored background area rendered thereon.

Other features of the present invention will become apparent as the following description proceeds and upon reference to the drawings, in which.

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 5:
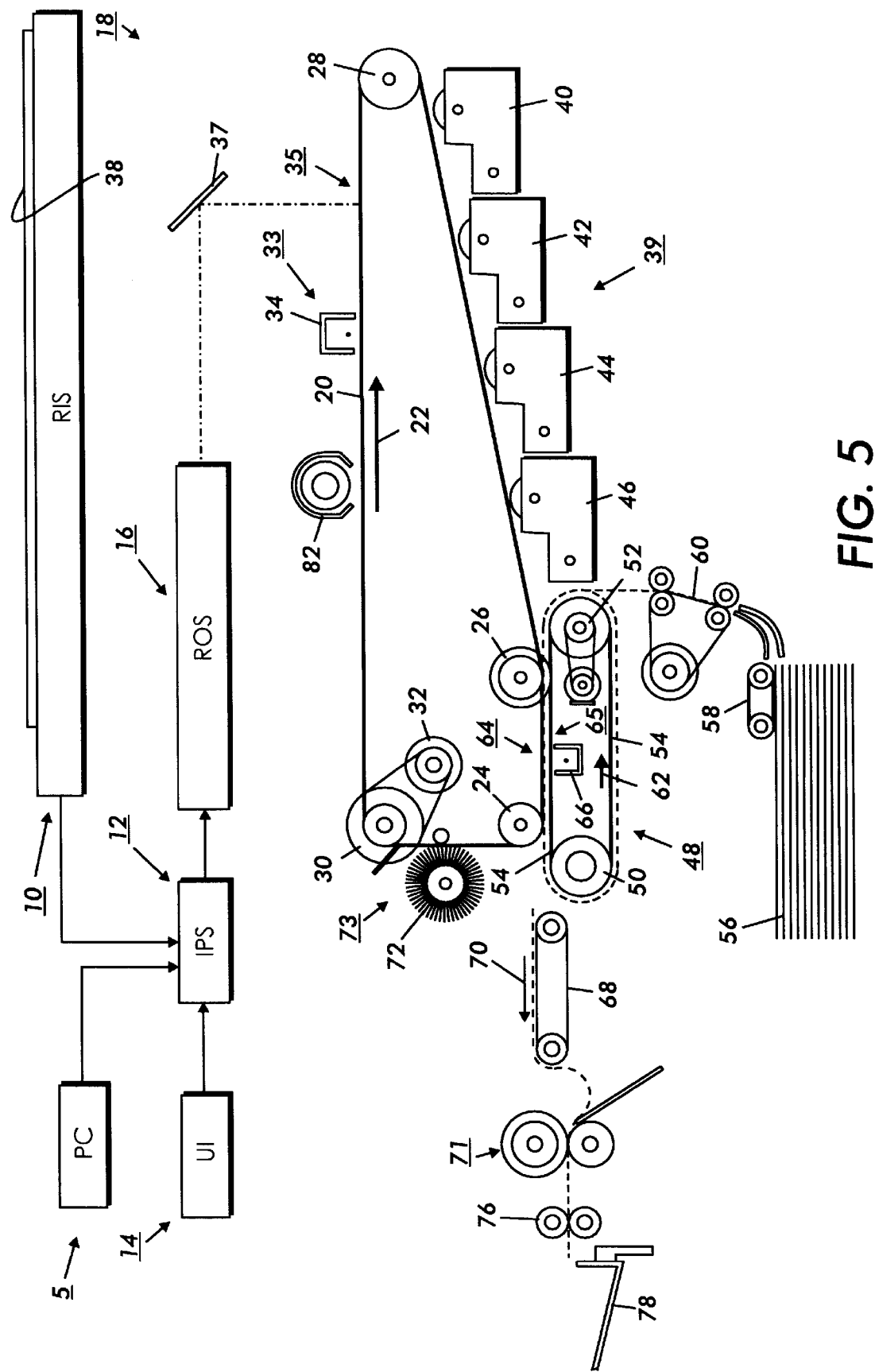
FIG. 5 shows an exemplary xerographic printing/copying machine and a networked PC which may incorporate features of the present invention.

For a general understanding of the features of the present invention, reference is made to the drawings. FIG. 5 is a schematic elevational view showing an exemplary electrophotographic printing/copying machine and a networked PC which may incorporate features of the present invention therein. It will become evident from the following discussion that the system of the present invention is equally well suited for use in a wide variety of printing and copying systems, and therefore is not limited in application to the particular system(s) shown and described herein. An ESS (electronic subsystem) or image processing station (both referred to as IPS), indicated generally by the reference numeral 12, contains data processor and controller electronics (as described above and below) which prepare and manage the image data flow to a raster output scanner (ROS), and may otherwise employ the system of the present invention described herein, indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 5), as well as carry out the image rendering selections in accordance with the present invention as described in association with FIGS. 1 through 4 below.

As further shown in FIG. 5, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 5). IPS 12 may include the processor(s) and controller(s) (not shown in FIG. 5) required to perform the adaptive image rendering system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi or even asymmetrical resolutions, such as 300 ×1200 dpi, both configurations of which are employed in versions of the Xerox 4900 printer family.) The ROS will expose the photoconductive belt to record the latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 5, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 5) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 5) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 5) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, other xerographic and non-xerographic printer hardware implementations may be used with the hybrid imaging systems of the present invention, such as in the case of versions of the Xerox 4900 printer (which employs an intermediate transfer system) in which certain aspects of the system as outlined below have been tested.

In conjunction with FIGS. 1 through 4, the present invention will be generally be described in terms of its application to a printer or copier such as described above in association with FIG. 5. The descriptions that follow describe a embodiments of the present invention as may be implemented in a print engine that accepts a description of a page to be printed in the form of a Printer Description Language (PDL) such as PostScript Level II. The present invention provides a streamlined system for trapping images to overcome misregistration, border "halo" or other undesirable hardware or software-related image rendering defects.

Figure 1:
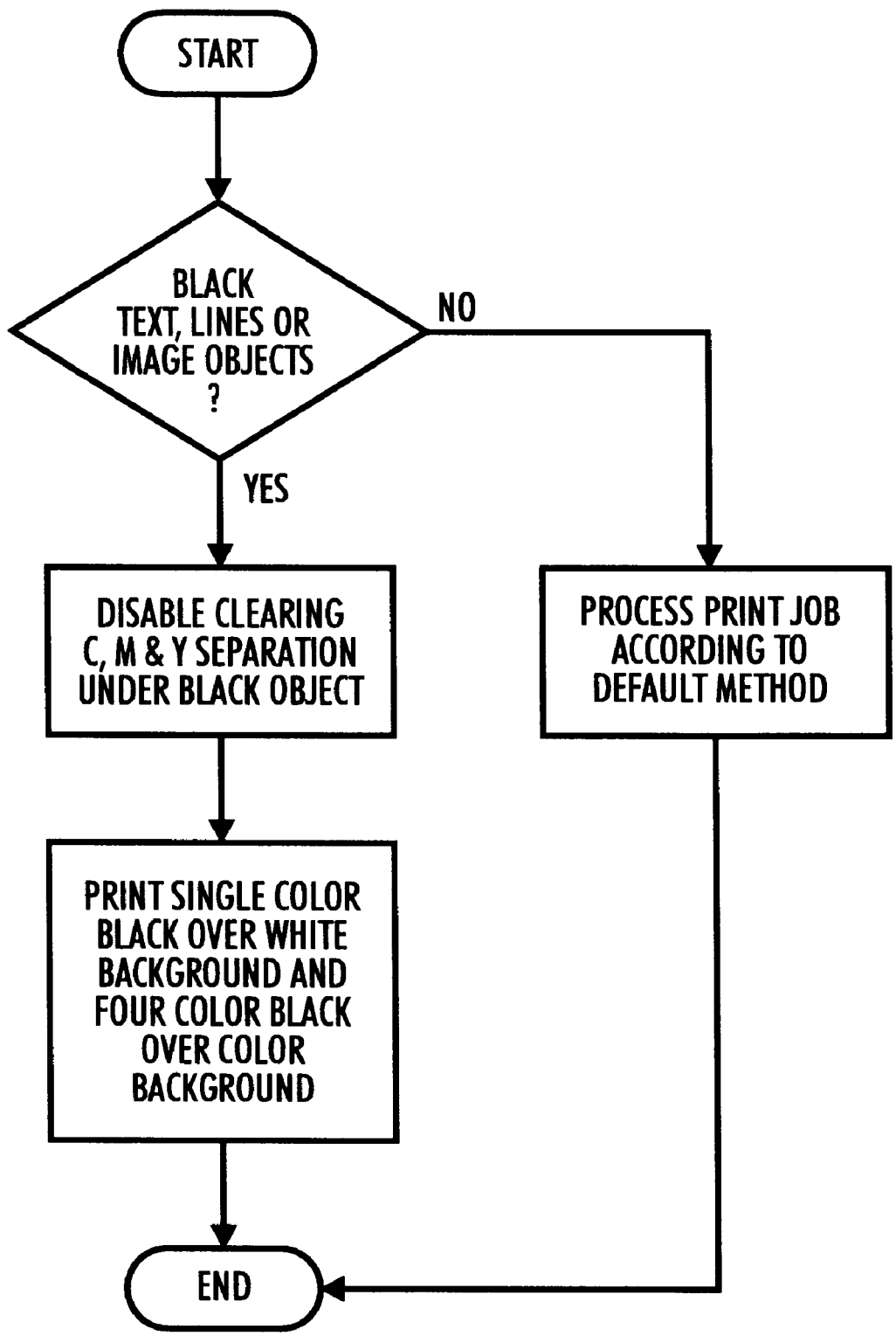
FIG. 1 is a flowchart showing a trapping system of the present invention.

FIGS. 1 is a flow chart of an exemplary trapping system of the present invention. Multiple color image misregistration is one example of when digital color printing problems can arise in multi-pass color print engines (such as shown and described in association with FIG. 5). For example, when black text or lines are printed on a colored background, the registration of the black text or line and colored background area may be unaligned, a white (paper color) "halo" effect on one or more sides of the text may be created, resulting in highly visible and undesirable rendered image degradation. In the case of fine print, lines or even pictorial or small graphic images, such misregistration can appear even more pronounced, as well as making text difficult to read. In that "perfect" multi-color printing registration is difficult (or might occur only by chance on even the most precise printing engines), electronic printing technologies can turn to image processing solutions to counteract misregistration problems in order to enhance image quality.

Figure 2:
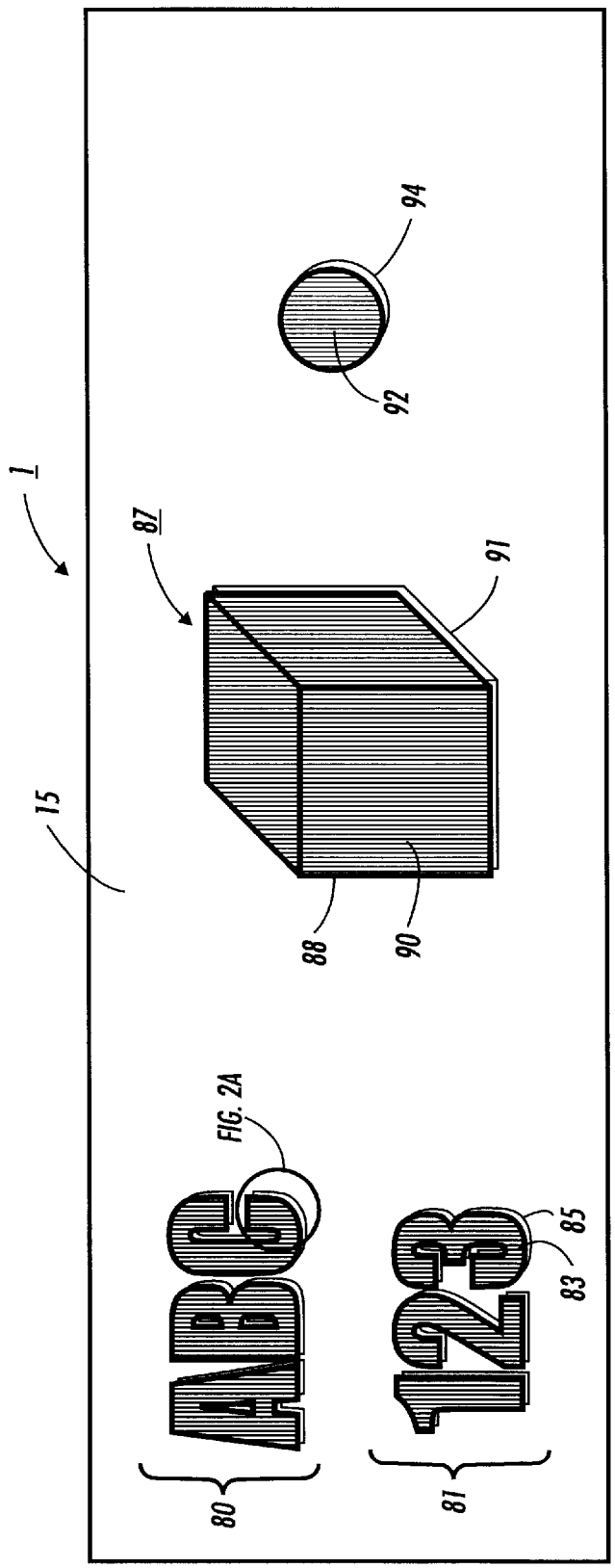
FIG. 2 is an exemplary output showing a representative misregistered color rendering (without trapping)

This problem can be caused by image processing or print engine operating reality or other reason. Misregistration of the color separations or planes may actually be caused by the method in which the image planes are created. Generally, due to image quality versus hardware costs tradeoffs, image quality sacrifices are often made in favor of cost control. Registration problems in the graphic arts industry have been dealt with for years, according to graphic arts spreading and choking techniques. "Spreading" may be defined as growth of an object within the image, while "choking" may be defined as the reduction of an object within the image. In the example of text printing on a colored background, the black text is spread, while the "hollowed out" area in the solid color background is choked. The result is a slight overlap of the solid color background with the black text image, which is able to hide misregistration problems (again, such as may occur with a multi-pass or other color print engine such as shown and described in association with FIG. 5). While trapping (or the combination of spreading and choking) is not complex to implement in the graphics arts industry, a trapping implementation in the digital electronic imaging industry can be quite difficult. In electronic imaging, one implementation includes changing the page description language (PDL) representation (format) of the image. The appearance of a representative trapped or choked (or precisely registered)) image on a colored background (FIG. 3) can be compared to a misregistered/untrapped misregistered image (FIG. 2). Rendering tests performed on PostScript PDL files on a xerographic color printer demonstrate the effectiveness of the trapping solution of the present invention.

Misregistration of primary color planes in color printers can create a variety of undesirable artifacts in the boundary between objects whose primary components are mutually exclusive. For instance, if a cyan circle is placed within an area of magenta, the pixels in the magenta area that overlap with the cyan circle will create a blue boarder or ring. While the same effects may be created when a black object is placed on top of a colored area. However, in that black will block out any other color black text, lines or objects on top of primary colors will not significantly affect image appearance.

In one embodiment of the present invention, the use of the overprint operator in PostScript level 2 in the separation color space permits the effective printing of black text and graphics without cutting out of the respective shape in the cyan, magenta, and yellow color planes. (This overprint operator allows a color to be placed into a color plane without the respective pixel locations in the other three planes being affected.) The default behavior for the image processor might typically be to erase pixels in other planes of the frame buffer when using separation color space. In the present invention, imaging colors without cutting out the background pixels is used in rendering 100% black objects.

In this manner, the trapping of black objects can be accomplished by including the following PostScript code sets in the header of a PostScript file in an imager that supports the setoverprint operator, with basic code sets as follows:

true setoverprint % disable cutting out cmy planes when imaging black/_setgrbcolor systemdict/setrgbcolor get def/setrgbcolor {3 copy add 0 eq % if color is black, don't cut out other planes {true setoverprint [/Separation/Black/DeviceCMYK{}] setcolorspace 1 setcolor pop pop pop}

{_setrgbcolor} ifelse

```
} def
—OR—
/X_BlackOverPrintOverLoad
{
userdict begin
userdict/X_BlackOverPrint known
{
userdict/X_BlackOverPrint get{
/X_PreBlackOverprintProc
{
userdict/X_SavedOverprint currentoverprint put current-
    colorspace dup type cvlit /arraytype eq {0 get} if
    /DeviceGray eq
{
currentcolor 0 eq
{
true setoverprint
[/Separation/Black/DeviceCMYK {}] setcolorspace
1 setcolor
true
}
{false}
ifelse
}
{false}
ifelse
userdict exch/X_SavedColorspace exch put }bind def
/X_PostBlackOverprintProc
{
userdict/X_SavedOverprint get
userdict/X_SavedColorspace get
{setoverprint [/DeviceGray] setcolorspace 0 setcolor}
{pop}
ifelse
} bind def
```

The positive affect of the trapping solution of the present invention can be quite dramatic. (Compare FIGS. 2 and 2A to FIGS. 3 and 3A.) The PostScript PDL file explicitly writes white lines before writing black lines such that the present solution can result in greatly improved and substantially more pleasing rendered text and images. For example, a clip art or other graphic images may be developed or used so as to capitalize on the desirable output qualities of images rendered according to the present invention.

Figure 2A:
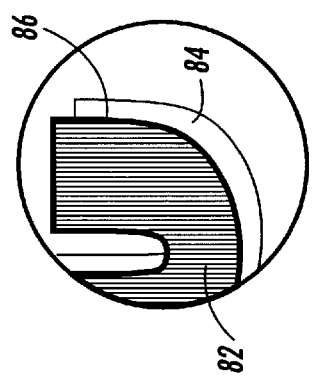

As discussed above, FIG. 1 outlines one version of an efficient trapping system of the present invention as applied to CMYK separations that can prevent the appearance of the halo effects outlined in conjunction with FIGS. 2 and 2A. The system of the present invention may be considered by some to be a simulated trapping solution, in that the (colored) background of the trapped image is "spread" to include the entire area the black text or image overlays. FIG. 1 shows a flow-chart of a basic implementation of the trapping system of the present invention whereby once black text or an appropriate image object is detected, the system disables clearing of cyan, magenta and yellow separations under the black object, so as to print with a black toner plus process black (C, M and Y separations) in the trap area. Thereafter, the system is rendered by printing single colored black over white areas and up to four-color black (black plus the other toners present) over colored background areas. If the system detects or an operator selects that no trapping solution is desired or necessary, then the print job is processed according to default methods without trapping.

As shown in FIGS. 2 and 2A, various untrapped or misregistered examples are shown for a rendered image 1 including a colored background 15 with a variety of text and objects thereon. A black outlined text portion 80 is shown having text areas 82 and black outline 86, as well as an adjacent white "halo" area 84, where the colored background area 15 is not present or has been cleared from under black outlined text 80.

FIG. 2 also shows a solid text portion 81 (black outline for illustration purposes only) with a misregistered or untrapped solid text areas 83, having an adjacent white "halo" area 85, where the colored background area 15 is not present or has been cleared from under solid text areas 83. FIG. 2 also shows a black outlined graphic object 87, with black lines 88 and solid object area 90; an adjacent white "halo" area 91, where the colored background area 15 is not present or has been cleared from under black outlined object 87 is also shown. FIG. 2 also shows a solid black object 92 an adjacent white "halo" area 94, where the colored background area 15 is likewise not present or has been cleared.

Figure 3:
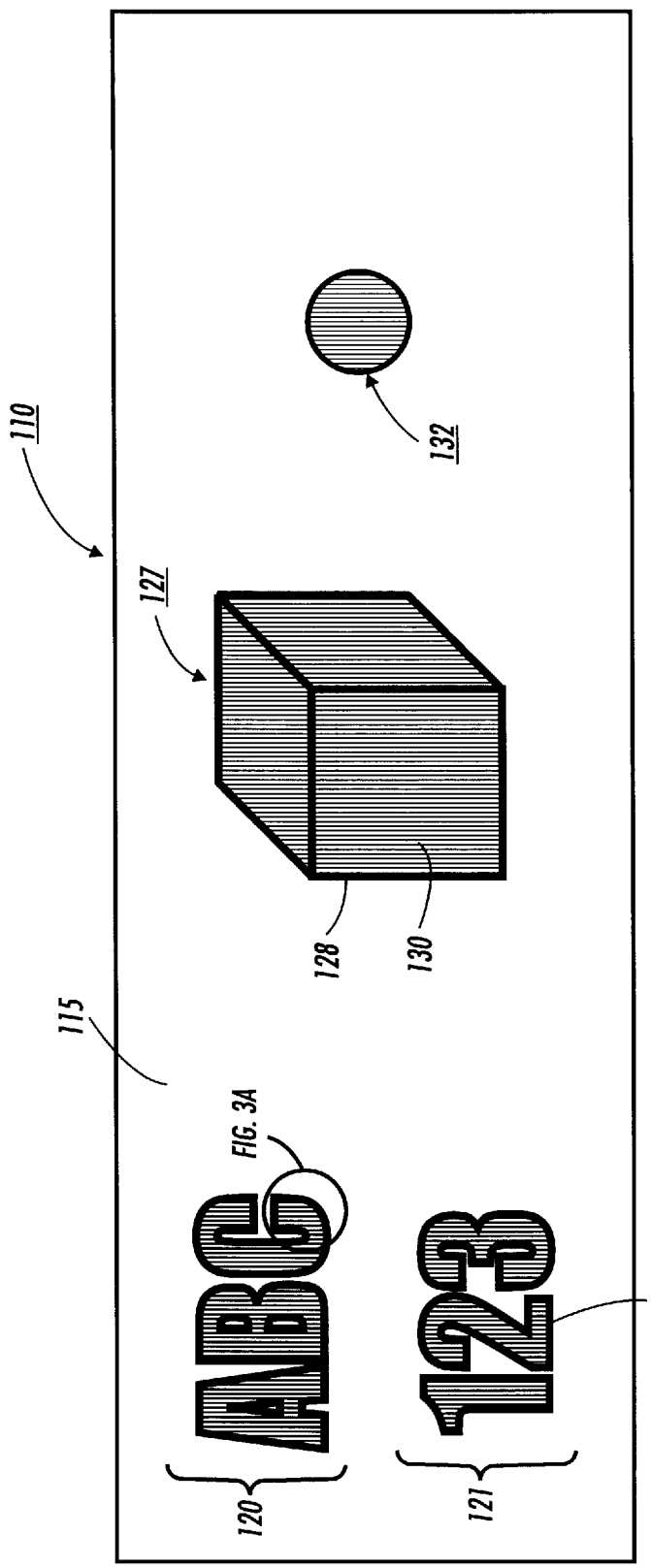
FIG. 3 is a representative trapped printed color rendering such as may be produced in accordance with the present invention.
Figure 3A:
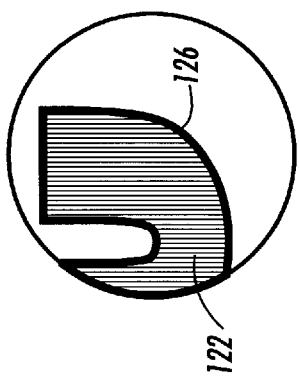

FIGS. 3 and 3A show representative outputs according to the trapping system of the present invention for a rendered image 110 including a colored background 115 having a variety of text and objects thereon. A black outlined text portion 120 is shown having text areas 122 and black outline 126 and no adjacent white "halo" area, as the colored background 115 has been extended under the black outline. A solid black text portion 121 (black outline for illustration purposes only) with a trapped solid text areas 123 also has no adjacent white "halo" area, as the colored background area 115 has not been cleared from under solid black text areas 123. FIG. 3 also shows a black outlined graphic solid black object 132 (black outline for illustration purposes only) without the adjacent white "halo" areas shown in FIG. 2.

Figure 4:
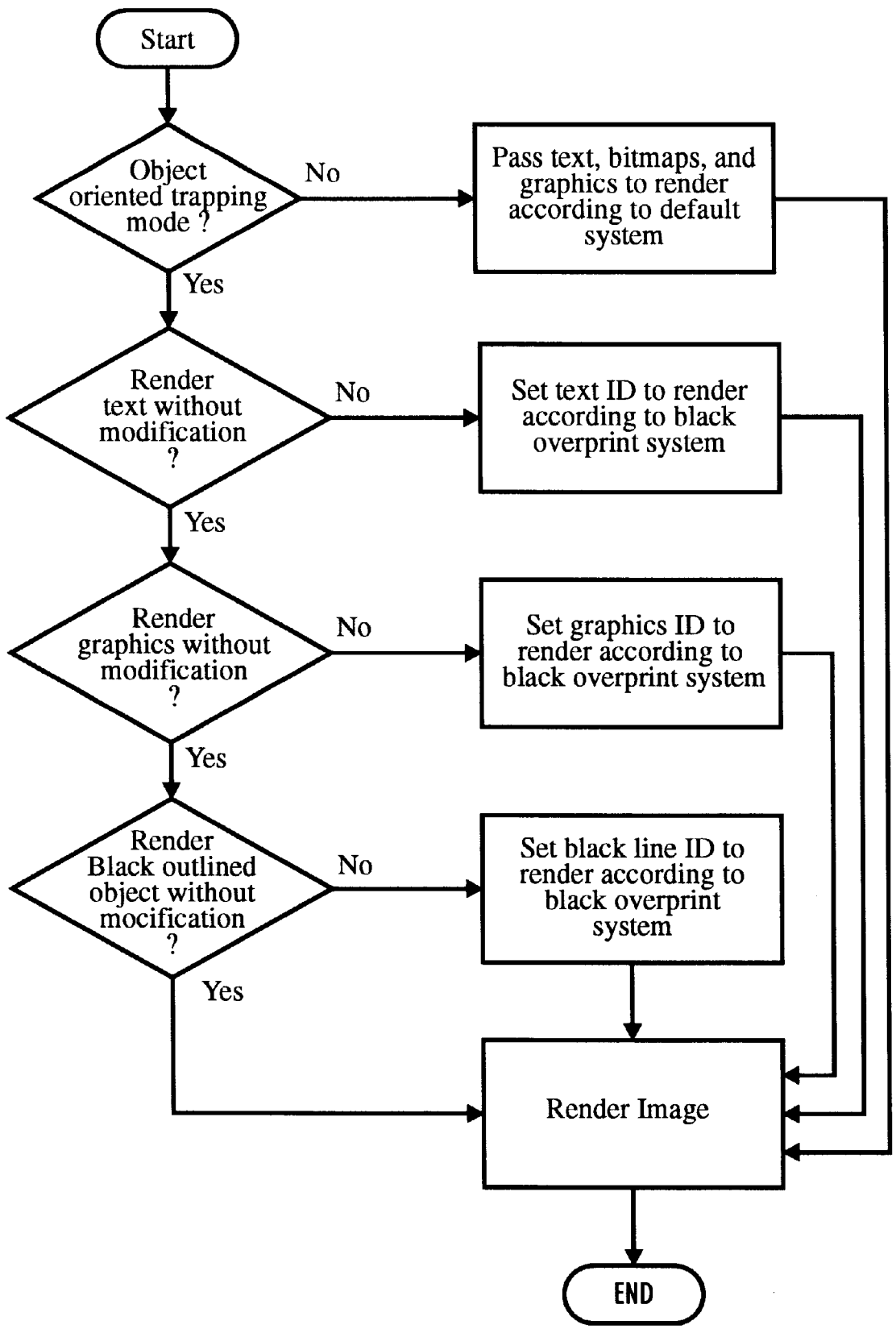
FIG. 4 is a flowchart showing another embodiment of a multimode trapping system of the present invention.

FIG. 4 shows another implementation of the system of the present invention wherein an original image may be processed and trapped differentially, such as according to image object type. For example, as shown in FIG. 4, a system may be set up to allow a user to select to trap text and line image objects according to the system of the present invention, whereas a more sophisticated trapping system (such as disclosed in U.S. application Ser. No. 08/363,082, entitled "Electronic Trapping System For Digitized Text and Images" assigned to Xerox, incorporated herein by reference) may be used to trap graphic image objects. In this manner, multimode trapping of images according to a plurality of object types can be performed. As different object types are identified, for example, text may be trapped by total area coverage with a background color area, while another object type (like graphics) can be trapped according to a system that traps with less than the total object area.

In that toner pile height problems are less of an issue for such "narrow" objects such as text and lines, a more efficient trapping system (such as the system of the present invention) may be employed, rather than other object areas that might demand more memory, processing time and/or hardware (such as more black/colored image area coverage trapping systems like U.S. application Ser. No. 08/363,082). When a user selects an object oriented trapping mode, the system may render text, graphics and/or black line surrounding objects according to subsequent selections. If no object oriented trapping is selected, then all portions of the image are passed on for rendering according to the default imaging system without the trapping system. When a user enables text trap rendering, when text objects are identified by object type, such as described in U.S. application Ser. No. 08/664,297 entitled Adaptable Image Rendering System, assigned to Xerox, incorporated herein by reference) or otherwise, they are rendered according to the system of the present invention. Likewise, when a user enables graphic object rendering, then a more sophisticated ("default" in FIG. 4) trapping such as described in U.S. application Ser. No. 08/363,082, in the Seybold Report pages 1–34 (incorporated by reference herein) or other trapping system may be employed. A menu system (not shown in FIG. 4) may allow users to designate the use of different trapping systems for different object types. For example, a user might be able to designate text, lines and graphics to be trapped by the system disclosed herein or one or more other default or selectable trap systems.

While present invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A method for preventing undesirable image artifacts from occurring in a border region between a black image area and a colored background area on an output image produced by a digital printing system, said printing system operable to render the output images in a black plane and at least one color plane and including a processor for processing a stream of imaging data including page description language file code for clearing the at least one color plane in a trap area corresponding to a portion of the black image area, said method comprising the steps of:

(a) setting the page description language file code to enable rendering of the at least one color plane of the colored background area in the trap area superposed with the black image area;

(b) producing an output image including the at least one black image area, the superposed trap area with the at least one color plane and the colored background area rendered thereon; and (c) suspending undercolor removal of the at least one color plane in an area corresponding to a portion of the black image area.

2. The method of claim 1, wherein the black image area includes at least one text object type.

3. The method of claim 1, wherein the black image area includes at least one graphic object type.

4. The method of claim 1, wherein the black image area includes a plurality of image object types.

5. The method of claim 4, further comprising the step of:

(d) selecting at least one of said plurality of image object types as the black image area to be rendered in the at least one color plane of the colored background area in the trap area superposed with the black image area.

6. The method of claim 1, wherein said page description language includes a set of print operators including at least one overprint operator.

7. The method of claim 6, wherein said printer page description language is a PostScript Level II language.

8. A printing system including a processor for preventing undesirable image artifacts from occurring in a border region between a black image area and a colored background area when rendering output images in a black plane and at least one color plane, said processor being operable to process a stream of imaging data including page description language file code for clearing the at least one color plane in a trap area corresponding to a portion of the black image area and an undercolor removal code, said printing system comprising:

a controller for superposing the colored background area in the trap area having the at least one color plane with the black image area; and an imager for producing an output image including the at least one black image area, the superposed trap area with the at least one color plane and the colored background area;

said processor suspending an undercolor removal function of the undercolor removal code for removing a portion of the at least one color plane in the area corresponding to the black image area.

9. The printing system of claim 8, wherein the black image area includes at least one text object type.

10. The printing system of claim 8, wherein the black image area includes at least one graphic object type.

11. The printing system of claim 8, wherein the black image area includes a plurality of image object types.

12. The printing system of claim 11, further comprising:

a selector selecting at least one of said plurality of object types as the black image area to be rendered in the at least one color plane of the colored background area in the trap area superposed with the black image area.

13. The printing system of claim 8, wherein said page description language includes a set of print operators including at least one overprint operator.

14. The printing system of claim 13, wherein said printer page description language is a PostScript Level II language.

15. A method for multimode trapping of images according to a plurality of object types so as to prevent undesirable image artifacts from occurring in border regions between image object areas and background areas having at least one color separation to be produced by a multicolor digital printing system, said method comprising the steps:

(a) identifying a first object type having a first black image area;

(b) superposing the at least one color plane of the colored background area with the first black image area of the first object type in a first trap area corresponding to a size of the first black image area;

(c) identifying a second object type having a second black image area;

(d) superposing the at least one color plane of the colored background area with a portion of the second black image area of the second object type in a second trap area less than a size of the second black image area; and (e) producing an output image including the first black image area, second black image area, first trap area, second trap area and the colored background area rendered thereon.

16. The method of claim 15, wherein the digital printing system includes an undercolor removal system, and wherein the first trap area is created by disabling the undercolor removal system of the printing system in the at least one color plane of the colored background area superposed with the first black image area of the first object type.

17. The method of claim 15, wherein the first black image area includes at least one text object type.

18. The method of claim 15, wherein the second black image area includes at least one graphic object type.

19. The method of claim 15, wherein the digital printing system includes a page description language processor operable to process at least one overprint operator, and wherein the first trap area is created by enabling the at least one overprint operator.

20. The method of claim 19, wherein the printer page description language is a PostScript Level II language.

* * * * *